(12) United States Patent
Blumberg et al.

(10) Patent No.: US 6,735,073 B2
(45) Date of Patent: May 11, 2004

(54) ELECTRONIC DEVICES BASED ON DENSITY WAVE DIELECTRICS

(75) Inventors: Girsh Blumberg, New Providence, NJ (US); Peter B. Littlewood, Cambridge (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/043,372

(22) Filed: Jan. 9, 2002

(65) Prior Publication Data

US 2003/0128498 A1 Jul. 10, 2003

(51) Int. Cl.⁷ .................................................. H01G 4/06
(52) U.S. Cl. .................... 361/311; 361/313; 361/321.1; 361/321.5; 361/281
(58) Field of Search ................................ 361/311, 312, 361/313, 321.1, 321.5, 303, 305, 328, 329, 763, 765, 306.1, 306.3, 301.2, 301.4, 320; 501/134–135; 257/295, 296, 68

(56) References Cited

U.S. PATENT DOCUMENTS

| | | | |
|---|---|---|---|
| 4,580,110 A | | 4/1986 | Bhattacharya et al. .... 332/16 R |
| 4,636,737 A | | 1/1987 | Bhattacharya et al. ...... 329/110 |
| 5,572,052 A | * | 11/1996 | Kashihara et al. |
| 5,589,845 A | * | 12/1996 | Yandrofski et al. |
| 5,597,411 A | * | 1/1997 | Fritzsche et al. |
| 5,771,148 A | * | 6/1998 | Davis |
| 5,906,963 A | * | 5/1999 | Simon et al. |
| 6,083,765 A | * | 7/2000 | Tempel |
| 6,144,546 A | * | 11/2000 | Mizushima et al. |
| 6,297,200 B1 | * | 10/2001 | Simon et al. |

OTHER PUBLICATIONS

Siegrist, T. et al., *A New Layered Cuprate Structure–Type, $(A_{1-x} A'_x)_{14} Cu_{24} O_{41}$*, Mat. Res. Bull., 1988, vol. 23, pp. 1429–1438.

McCarron, E.M. III et al., *The Incommensurate Structure Of $(Sr_{14-x} Ca_x) Cu_{24} O_{41}$ ($0 < x \sim 8$), A Superconductor ByProduct*, Mat. Res. Bull., 1988, Vol 23, pp. 1355–1365.

Kimura, S., Shindo, I., *Single Crystal Growth of Yig by the Floating Zone Method*, Journal of Crystal Growth 41 (1977) pp. 192–198.

Strobel, P. et al., *Crystal Growth and Characterization of the Superconducting Phase in the Bi–Sr–Cu–O System*, Physica C 156 (1988) pp. 434–440.

Kitano, H. et al., *Microwave and millimeter wave spectroscopy in the slightly hole–doped ladders of $Sr_{14} Cu_{24} O_{41}$*, Europhysics Letters Preprint, Aug. 14, 2001, arXiv:cond-mat/0108222.

Motoyama, N., Osafune, T., Kakeshita, T., Eisaki, H., Uchida, S., *Effect of Ca substitution and pressure on the transport and magnetic properties of $Sr_{14} Cu_{24} O_{41}$ with doped two–leg Cu–O ladders*, Physical Review B, Feb. 1, 1997, vol. 55, No. 6, pp. R3386–R3389.

Tanaka, I., Kojima, H., *Superconducting single crystals*, Jan. 5, 1989, Nature vol. 337 pp. 21, 22.

Ramirez, A.P., Subramanian, M.A., Gardel, M., Blumberg, G., Li, D., Vogt, T., Shapiro, S.M., *Giant dielectric constant response in a copper–titanate*, Solid State Communications 115 (2000) pp. 217–220.

Osafune, T., Motoyama, N., Eisaki, H., Uchida, S., *Optical Study of the $Sr_{14-x} Ca_x Cu_{24} O_{41}$ System: Evidence for Hole–Doped $Cu_2O_3$ Ladders*, Mar. 10, 1997, vol. 78, No. 10., pp. 1980–1983.

McElfresh, M.W., Coey, J.M.D., Strobel, P., von Molnar, S., *Electronic properties of $Sr_{14} Cu_{24}O_{41}$*, Physical Review B, Jul. 1, 1989, vol. 40, No. 1., pp. 825–828.

(List continued on next page.)

Primary Examiner—Anthony Dinkins
Assistant Examiner—Nguyen T. Ha
(74) Attorney, Agent, or Firm—John F. McCabe (57) ABSTRACT

A capacitor includes first and second electrodes and a quasi 1D dielectric material disposed between the electrodes. The dielectric material has a charge or spin density wave state.

22 Claims, 9 Drawing Sheets

OTHER PUBLICATIONS

Gozar, A. et al., *Spin dynamics of $Sr_{14}\,Cu_{24}\,O_{41}$ two-ladder studied by Raman spectroscopy*, Physical Review Letters, Apr. 2, 2001, Preprint, arXiv:cond-mat/0108507 v2 (2001), 4 pages.

U.S. patent application Ser. No. 10/159,449, Blumberg et al., filed May 31, 2002.

McCarron, E.M. III et al., *The Incommensurate Structure of $(Sr_{14-x}\,Ca_x)Cu_{24}\,O_{41}$ ($0 < x \sim 8$), A Superconductor ByProduct*, Mat. Res. Bull., Vol 23, pp. 1355–1365.

Gruner, George: *Density Waves in Solids*, (Addison–Wesley Publishing Company, 1994), Ch. 2, pp. 15–30; Ch. 8, pp. 150–163; Ch. 9, pp. 164–181; Ch. 10, pp. 182–197.

Osafune, T., Motoyama, N., Eisaki, H., Uchida, S., *Optical Study of the $Sr_{14-x}\,Ca_x\,Cu_{24}\,O_{41}$ System: Evidence for Hole–Doped $Cu_2\,O_3$ Ladders*, Physical Review Letters, Mar. 10, 1997, vol. 78, No. 10., pp. 1980–1983.

Littlewood, P.B., "Screened dielectric response of sliding charge–density waves," The American Physical Society, Physical Review B, vol. 36, No. 6, Aug. 15, 1997–II, pp. 3108–3116.

Sugii, et al., "Growth of $Sr_{1-x}\,Nd_x\,CuO_y$ thin films by RF–magnetron sputtering and their crystallographic properties," Physica C 196, (1992), pp. 129–134.

Dorger, M., et al., "Room temperature charge transfer in two–leg cuprate ladder compounds," Physica C 341–348 (2000), pp. 477–478.

Lagues, M., et al., "Transport properties of MBE grown Cuprate Spin Ladders," Physica C 282–287 (1997), pp. 162–165.

Koster, G., et al., Abstract for: "Structure and properties of (Sr, Ca)CuO2–BaCuO2 superlattices grown by pulsed laser interval deposition", Physica C353 (3–4): 167–183, May 15, 2001, abstract is published on ISI Web of Science (2001), 1 page.

Kojima, K.M., et al., Abstract for: "The electronic properties of cuprate ladder materials," Journal of Electron Spectroscopy and Related Phenomena, 117:237–250, Jun. 2001, abstract is published on ISI Web of Science (2001), 1 page.

Blumberg, G., Littlewood, P., Gozar, A., Dennis, B.S., Motoyama, N., Eisaki, H., Uchida, S., *Sliding Density Wave in $Sr_{14}\,Cu_{24}\,O_{41}$Ladder Compounds*, Science, Jul. 26, 2002, vol. 297, pp. 584–587.

Vuletic, T., et al., "Suppression of the Charge–Density–Wave State in $Sr_{14}Cu_{24}O_{41}$ by Calcium Doping," Physical Review Letters, vol. 90, No. 25, pp. 257002–1 to 257002–4, Jun. 27, 2003.

Gozar, A., et al., "Collective Density–Wave Excitations in Two–Leg $Sr_{14-x}Ca_xCu_{24}O_{41}$ Ladders," Physical Review Letters, vol. 91, No. 8, pp. 087401–1 to 087401–4, Aug. 22, 2003.

U.S. patent application Ser. No.10/159,449, Blumberg et al., filed May 31, 2002.

Y. Furubayashi, T. Terashima, I. Chong, and M. Takano, *Epitaxial growth of single–crystalline thin film of $Ca_{14}Cu_{24}O_{41}$: A Heavily hole–doped two–legged spin ladder*, Physical Review B vol. 60, No. 6 (Aug. 1, 1999), pp. R3720–R3723.

Y. Furubayashi, T. Terashima, I. Chong, and M. Takano, *Epitaxial growth of single–crystalline thin film of Ca14Cu24O41: A heavily hole–doped two–legged spin ladder*, Physical Review B vol. 60, No. 6 (Aug. 1, 1999) pp. R3720–R3723.

\* cited by examiner

ELECTRONIC DEVICES BASED ON DENSITY WAVE DIELECTRICS

BACKGROUND

1. Field of the Invention

This invention relates to electronic devices that use dielectrics.

2. Discussion of the Related Art

Cuprates are crystalline materials with complex unit cells that contain copper-oxygen planes. Such materials often have quasi-one or quasi-two dimensional structures. Exemplary quasi-one dimensional cuprates include cuprate ladder materials. Exemplary quasi-two dimensional cuprates include high-temperature superconductors.

Figure 1:
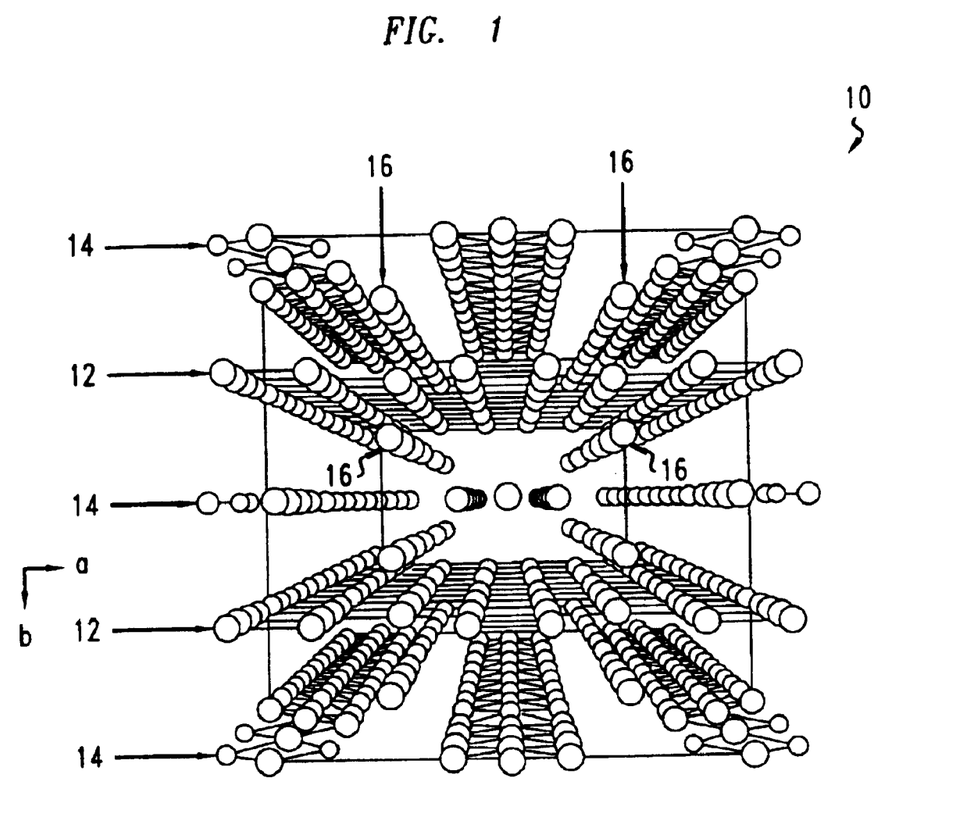
FIG. 1 is a perspective view of a cuprate ladder crystal along the crystal's anisotropy axis.

FIG. 1 is a perspective view along the c-axis of a generic cuprate ladder material 10. The cuprate ladder material 10 has the form of a stack along the crystal's b-axis. The stack includes alternating $Cu_2O_3$ sheets 12 and $CuO_2$ chains 14. The $Cu_2O_3$ sheets 12 and $CuO_2$ chains 14 are separated by rows of atoms 16 whose relative percentages are determined by the crystal's stoichiometry. For a crystal with the stoichiometry $(Sr_{14-x}Ca_x)Cu_{24}O_{41}$, the atoms 16 are Sr and/or Ca atoms.

Figure 2A:
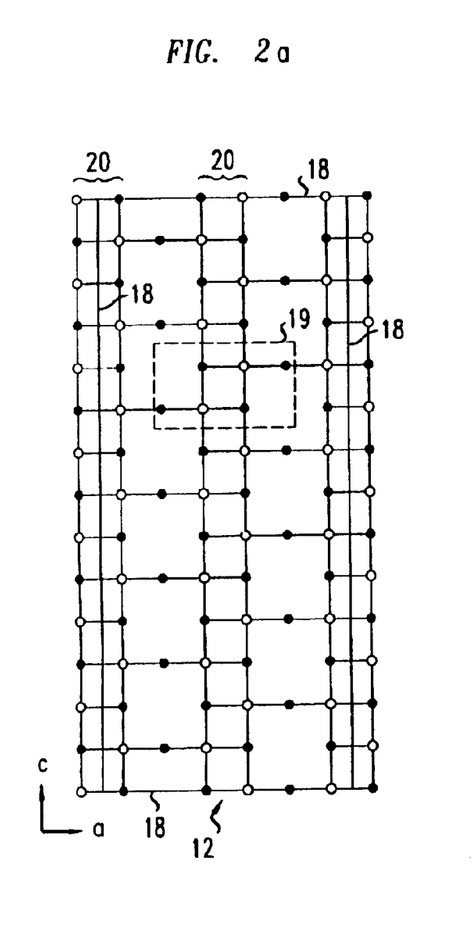
FIG. 2a is a side view of a portion of a $Cu_2O_3$ sheet located in one unit cell of the cuprate ladder crystal of FIG. 1.
Figure 2B:
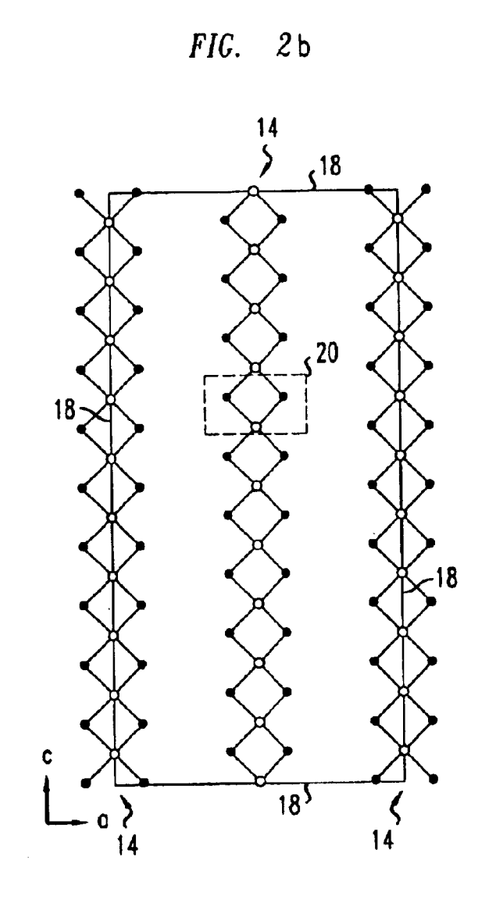
FIG. 2b is a side view of a portion of the $CuO_2$ chains located in the same unit cell of the cuprate ladder crystal of FIG. 1.
Figure 2C:
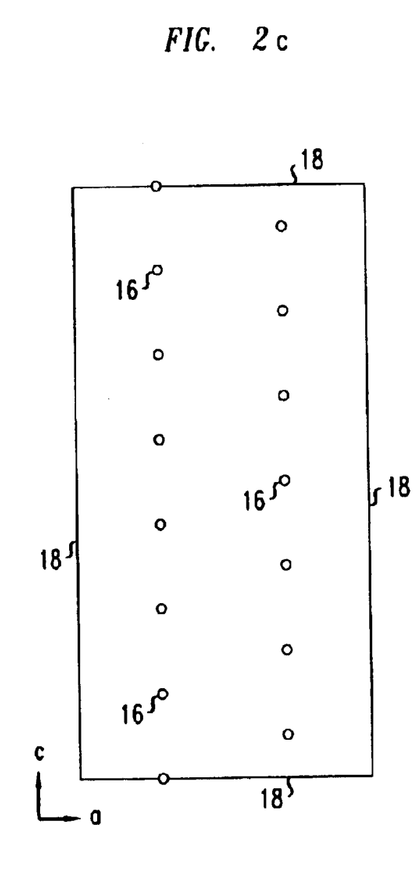
FIG. 2c is a side view of rows of Sr and/or Ca atoms located in the same unit cell of the cuprate ladder crystal of FIG. 1.

FIGS. 2a, 2b, and 2c are side views of the $Cu_2O_3$ sheets 12, $CuO_2$ chains 14, and rows of Sr, Ca 16 of one unit cell 18 of cuprate ladder material 10 of FIG. 1. The $Cu_2O_3$ sheets 12 include a ladder-like building block 19 of copper (light circles) bonded to oxygen (dark circles). In the $Cu_2O_3$ sheets 12, copper-oxygen ladders 19 link together via oxygen linkages. The $CuO_2$ chains 14 also have a building block 20 of copper bonded to oxygen. In the unit cell 18, the $Cu_2O_3$ sheet 12 and $CuO_2$ chain 14 have an almost commensurate structure in which seven blocks 19 match to ten blocks 20 along the c axis.

FIGS. 1, 2a–2c show that copper-oxygen ladders 19 define an anisotropy axis for the crystalline cuprate ladder material 10. The anisotropy axis is referred to as the c-axis. Due to the copper-oxygen ladders 19, cuprate ladder materials behave as quasi one-dimensional (1D) materials. Many such cuprate ladder crystals are 1D anti-ferromagnets with 1D lattice directions along the c-axis. It is believed that the copper-oxygen ladders cause the cuprate ladder crystals to behave as anti-ferromagnets.

Herein, a quasi-1D material has a strong anisotropy along a selected lattice axis. In exemplary quasi-1D materials, conductivities or dielectric constants are, at least, three times larger along the selected axis than along the remaining lattice axes.

SUMMARY

Various embodiments advantageously include dielectrics that are quasi one-dimensional (1D) materials. The quasi 1D materials may have charge or spin density wave state in which their dielectric constants have giant real parts. Some of these dielectric constants have giant real parts at room temperature and above.

In one aspect, the invention features a capacitor having two electrodes and a quasi 1D dielectric material disposed between the electrodes. The dielectric material has a charge or spin density wave state.

In another aspect, the invention features an antenna having first and second electrodes and a quasi 1D dielectric material. The electrodes are located adjacent portions of the dielectric material. The dielectric material has a charge or spin density wave state.

DETAILED DESCRIPTION

Herein, a material's complex dielectric constant is denoted by $\epsilon_1 + i\epsilon_2$. Both $\epsilon_1$ and $\epsilon_2$ depend on frequency, $\omega$, and on the material's temperature, T.

Recent measurements have enabled determinations of the frequency-dependent dielectric constants of some cuprate ladder crystals. These cuprate ladder crystals have dielectric constants with large or giant real parts, e.g., about $10^3$ times larger than those of other typically good dielectrics at similar temperatures. Such large dielectric constants were unexpected for cuprates, which were previously known for characteristics as anti-ferromagnets and/or high-temperature superconductors.

Figure 3:
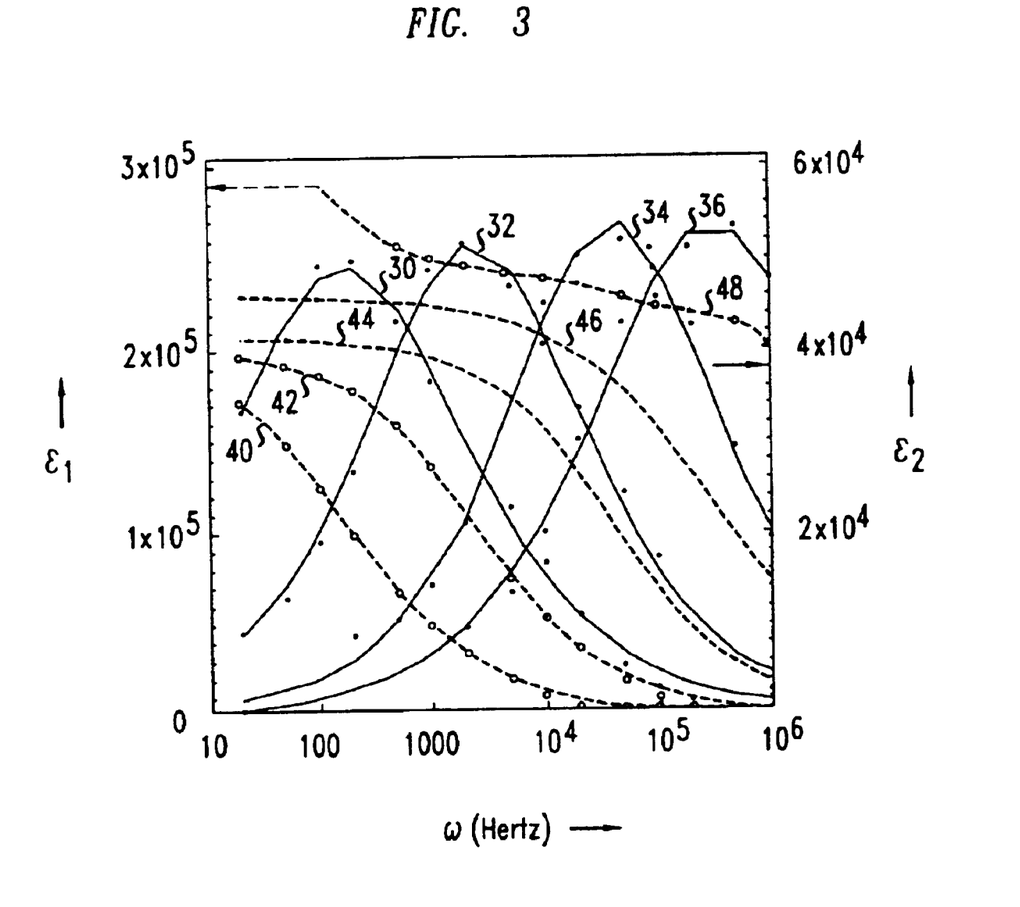
FIG. 3 shows how real and imaginary parts of the dielectric constant of a $Sr_{14}Cu_{24}O_{41}$ cuprate ladder crystal depend on frequency at various temperatures.

FIG. 3 is a semi-log plot of measured values of $\epsilon_2$ as a function of frequency, i.e., in Hertz, along the c-axis of a sample cuprate ladder crystal. The sample cuprate ladder crystal has a stoichiometric formula of $Sr_{14}Cu_{24}O_{41}$. The plot shows measured values, i.e., black dots, at various temperatures. To better show how $\epsilon_2$ depends on frequency, graphs 30, 32, 34, and 36 have been drawn to interpolate between the measured values for sample temperatures of 85° K., 100° K., 125° K., and 150° K., respectively.

The graphs 30, 32, 34, 36 show that $\epsilon_2$ has a giant dissipation peak at frequency, $\omega_{scr}$, i.e., peak values of $\epsilon_2$ are about $10^4$ of greater. For the measured temperatures, the peak frequency is relatively low, i.e., in the range of about $10^2$ to about $10^6$ Hertz. The graphs 30, 32, 34, 36 also show that $\omega_{scr}$ rapidly moves to higher values as the crystal's temperature increases. At room temperature, $\omega_{scr}$ is in the range of about $10^8$ Hertz to about $10^{11}$ Hertz (see below).

FIG. 3 also provides graphs 40, 42, 44, 46, and 48 that show the frequency-dependence of $\epsilon_1$ along the c-axis for the same cuprate ladder crystal. The graphs 40, 42, 44, 46, and 48 correspond to crystal temperatures of 85° K., 100° K., 125° K., 150° K., and 300° K., respectively. The data of graphs 40, 42, 44, 46, 48 were obtained from measurements of $\epsilon_2(\omega)$ at corresponding temperatures. The graphs 40, 42, 44, 46, 48 show that $\epsilon_1$ is large along the c-axis for frequencies below the frequency, $\omega_{scr}$, of the giant dissipation peak in $\epsilon_2$ and that $\epsilon_1$ is much smaller above $\omega_{scr}$. Below $\omega_{scr}$, the value of $\epsilon_1$ along the c-axis is in the approximate range of $1-3\times10^5$ and is thus, larger than the $\epsilon_1$ of other known dielectrics at comparable temperatures.

The fact that some cuprate ladder materials make excellent dielectrics was unexpected. Prior art publications describe cuprate materials as superconductors and anti-ferromagnets rather than as excellent dielectrics.

Since cuprate ladder crystals are anisotropic, their dielectric properties are also anisotropic. For example, values of $\epsilon_1$ along the crystal's a- and b-axes are, at least, an order of magnitude smaller than the values of $\epsilon_1$ along the crystal's c-axis.

Graphs 30–36 also show that $\omega_{scr}$ moves rapidly to higher frequencies as the temperature increases. Thus, the frequency range over which $\epsilon_1$ is large also increases rapidly with the crystal's temperature.

Figure 4:
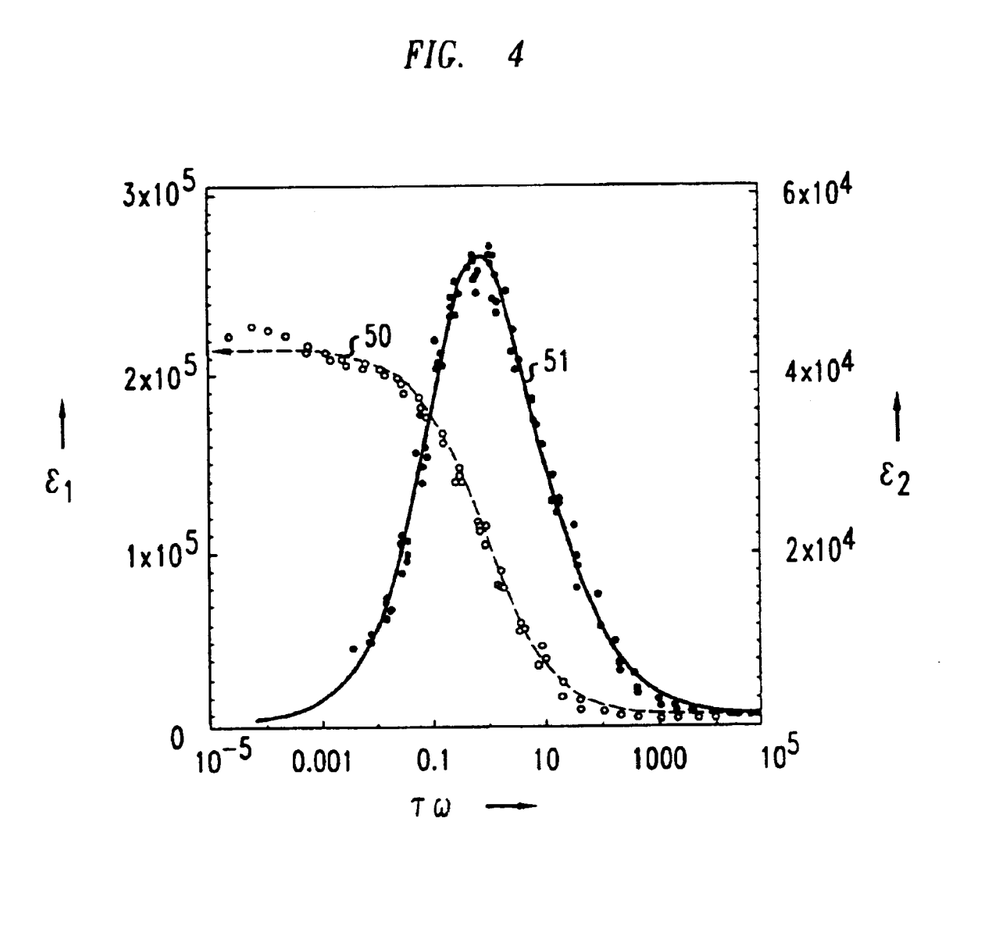
FIG. 4 represents scaling forms of the real and imaginary parts of the dielectric constant for the same $Sr_{14}Cu_{24}O_{41}$ cuprate ladder crystal.

FIG. 4 shows data points for $\epsilon_1$ (light circles) and $\epsilon_2$ (dark circles) as a function of frequency, $\omega$, times relaxation time, $\tau$. Herein, $\tau=1/\omega_{scr}$. The data points correspond various temperatures between 80° K. and 160° K. and to various frequencies between about 10 Hertz and $10^6$ Hertz. For these temperatures and frequencies, the data points for $\epsilon_1$ and $\epsilon_2$ lie respectively, on graph 50 and graph 51 when plotted as function of $\tau\omega$. This graphical result indicates that the dielectric constant of the $Sr_{14}Cu_{24}O_{41}$ cuprate ladder crystal depends only on the product $\tau\omega$.

Figure 5:
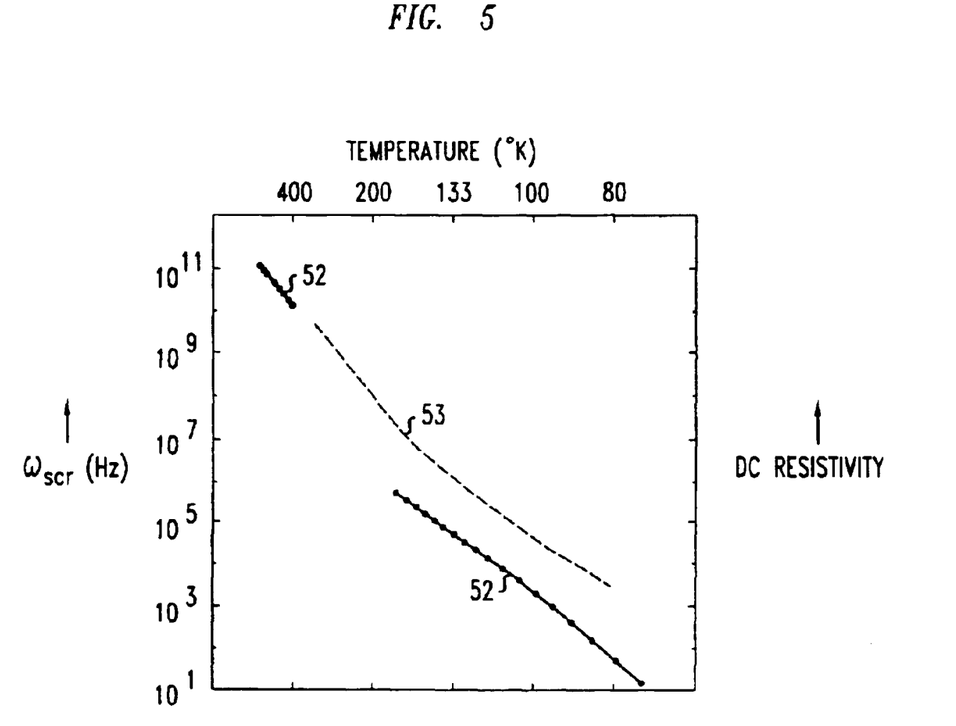
FIG. 5 shows how the frequency of the screening peaks of FIG. 3 depend on temperature.

FIG. 5 is a graph 52 of $\omega_{scr}$ as a function of the temperature $Sr_{14}Cu_{24}O_{41}$ cuprate ladder crystal. In the graph 52, the low and high temperature values of $\omega_{scr}$ were obtained from measurements of electrical transport properties and Raman absorption, respectively. The graph 52 shows that $\omega_{scr}$ depends approximately exponentially on the inverse temperature, i.e., $T^{-1}$. The graph also shows that $\omega_{scr}$ is equal to or greater than about 5 Giga Hertz at room temperature, i.e., 293° K.

Since $\omega_{scr}$ is the upper cutoff frequency that defines the region with large values of $\epsilon_1$, the results in graph 52 show that this upper cutoff frequency increase rapidly with temperature. In particular, the upper cutoff frequency in the $Sr_{14}Cu_{24}O_{41}$ cuprate ladder crystal is about 10 giga-Hertz or higher at room temperature. Thus, this cuprate ladder crystal will operate as an excellent room temperature dielectric at microwave and millimeter-wave wavelengths.

Experimental observations also show that the $Sr_{14}Cu_{24}O_{41}$ cuprate ladder crystal has distinctive properties at the temperatures of the measurements shown in FIG. 3. The observed properties include an Arrhenius temperature-dependence of $\omega_{scr}$, a nonlinear DC conductivity, and multiple dissipation peaks in the crystal's dielectric constant. Each of these properties is characteristic of a charge or spin density wave state.

An Arrhenius law dependence means that $\omega_{scr}$ is roughly proportional to the free carrier DC resistivity.

Referring to FIG. 5, the temperature dependence of $\omega_{scr}$ and of the free carrier DC resistivity for the $Sr_{14}Cu_{24}O_{41}$ cuprate ladder crystal are shown in graph 52 and 53, respectively. The graphs 52, 53 indicate that $\omega_{scr}$ is approximately proportional to the DC resistivity. Thus, $\omega_{scr}$ has the Arrhenius law dependence, which is a characteristic a charge or spin density wave state.

Figure 6:
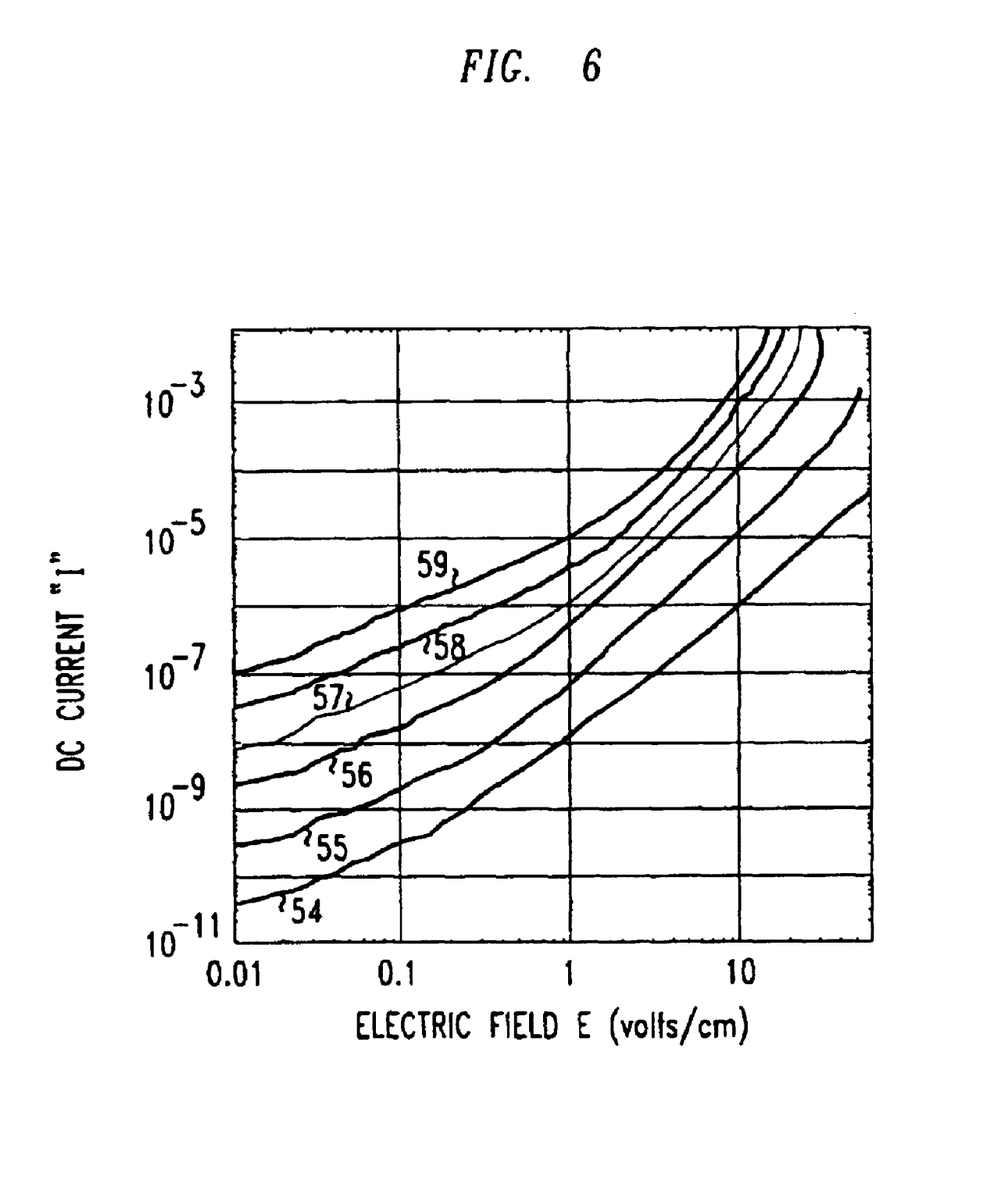
FIG. 6 shows how the DC conductivity of the same $Sr_{14}Cu_{24}O_{41}$ cuprate ladder crystal depends on electric field intensity at various temperatures.

In graphs 54, 55, 56, 57, 58, and 59, FIG. 6 plots the DC current, I, of the same cuprate ladder crystal at 80° K., 100° K., 120° K., 140° K., 160° K. and 180° K., respectively. The graphs 54–59 show that I varies linearly with electric field intensity, E, for small values of E, i.e., for E<0.1 volts/cm, and varies approximately like $E^P$ with $P \geq 2$ for large values of E, e.g., for E>1 volts/cm. The nonlinear variation of I with E indicates a nonlinear conductivity. The nonlinear conductivity for large values of E is another signature of a pinned charge or spin density wave state. A large value of E depins charge or spin density waves, which then produce a nonlinear contribution to the conductivity. See e.g., Chapter 10, DENSITY WAVES IN SOLIDS by George Grüner (Addison-Wesley 1994).

The $Sr_{14}Cu_{24}O_{41}$ cuprate ladder crystal also has two dissipation peaks in $\epsilon_2$. The peak frequency of the lower frequency dissipation peak increases rapidly with temperature. Also, the lower frequency dissipation peak is much larger than the higher frequency dissipation peak.

Figure 7:
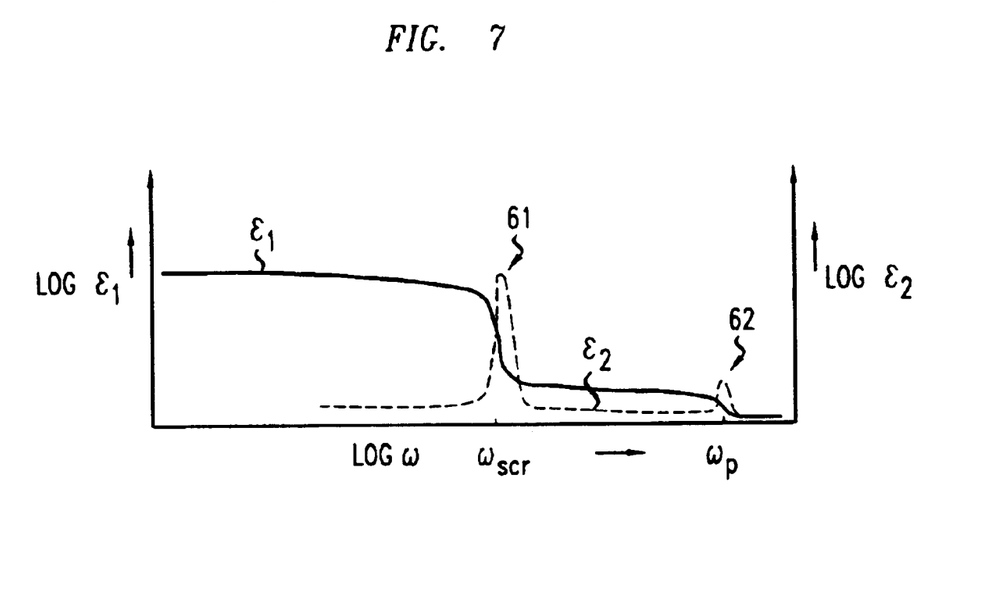
FIG. 7 shows how real and imaginary parts of the dielectric constant of a pinned charge or spin density wave material vary with frequency.

FIG. 7 shows the frequency dependence of $\epsilon_2$ for a material in a charge or spin density wave state (dashed curve). The curve for $\epsilon_2$ has two dissipation peaks 61, 62, which cause step-like changes in $\epsilon_1$ (solid curve) at peak frequencies $\omega_{scr}$ and $\omega_p$. The peaks 61 and 62 are associated with respective screening and pinning frequencies of the density waves. The screening peak 61 occurs at a frequency, $\omega_{scr}$, that is lower than the pinning frequency, $\omega_p$, associated with the peak 62. The value of $\omega_{scr}$ increases with temperature, because the screening peak is caused by quasi-particle screening and quasi-particle excitations respond more rapidly at higher temperatures. The screening peak 61 is also larger than the pinning peak 60.

The observed low and high frequency dissipation peaks of the $Sr_{14}Cu_{24}O_{41}$ cuprate ladder crystal correspond to the respective screening and pinning peaks of a material in a charge or spin density wave state.

The fact that the $Sr_{14}Cu_{24}O_{41}$ cuprate ladder crystal is in a charge or spin density wave state when it is as an excellent dielectric implies that other quasi-1D materials that have charge or spin density wave states will also be excellent dielectrics.

The $Sr_{14}Cu_{24}O_{41}$ cuprate ladder crystal behaves as a doped quasi-1D anti-ferromagnet. Quasi-1D anti-ferromagnets have free energies, F, of the form:

$$F = J\Sigma_{i=1,\ldots,N} S_i \cdot S_{i+1}.$$

Here, N is the number of lattice sites "i", $S_i$ is the spin vector at site "i", and J is the positive anti-ferromagnetic exchange interaction energy of neighboring spins. Such doped quasi-1D anti-ferromagnets have low temperature spin wave states, which melt at a transition temperature, $T_N$. The value of the melting temperature, $T_N$, is approximately defined by $T_N \approx J/K_B$ where $K_B$ is Boltzman's constant.

Since spin density wave states seem to cause materials to operate as excellent dielectrics, other doped quasi-1D anti-ferromagnets will operate as excellent dielectrics at temperatures below their melting temperatures, $T_N$'. Thus, doped quasi-1D anti-ferromagnets for which $J/K_B > 293°$ K. should operate as excellent dielectrics at room temperature. Similarly, doped quasi-1D anti-ferromagnetic materials for which $J/K_B > 373°$ K. should operate as excellent dielectrics at least up to 100° C. Materials with large enough J's to be in spin density wave states at room temperature and above temperatures include cuprate ladder materials and vanadites, i.e., quasi-1D materials with the stoichiometry $NaV_2O_5$.

Spin and/or charge density wave materials with high melting temperatures provide advantageous dielectrics for electronic devices that operate at room temperature and above. The advantages are illustrated in electronic devices shown in FIGS. 8–10.

Figure 8:
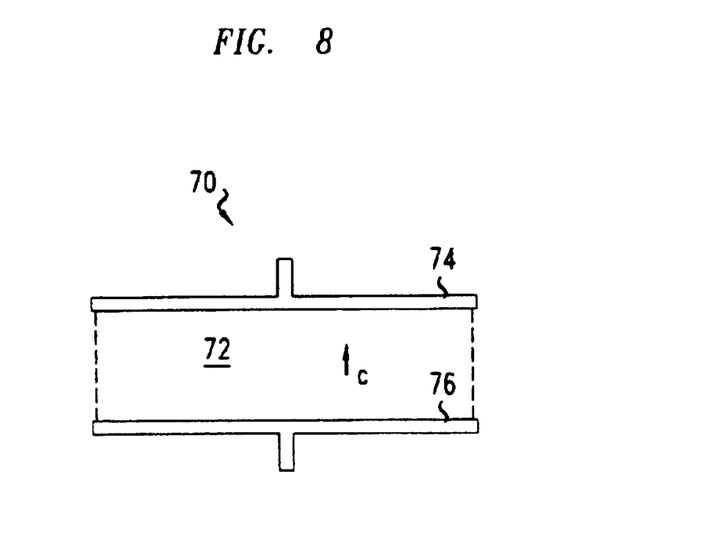
FIG. 8 shows a capacitor whose dielectric is a charge or spin density wave material.

FIG. 8 shows a capacitor 70 whose dielectric material 72 has a spin or charge density wave state. The density wave state persists at the capacitor's operating temperature, e.g., room temperature or above. The dielectric material 72 has an anisotropy direction "c" that defines the direction in which the density waves move. For a cuprate ladder crystal, "c" is the crystal's c-axis. In general, the anisotropy direction "c" is oriented along an imaginary line that connects inner surfaces of the capacitor electrodes 74, 76. This orientation maximizes the effective dielectric constant and the capacitance of the capacitor 70.

Exemplary dielectric materials 72 are charge or spin density wave materials such as cuprate chains and ladders or materials described by quasi-1D anti-ferromagnets with large interaction energies.

The dielectric material is either crystalline or polycrystalline. If the dielectric 72 is polycrystalline, anisotropy axes of individual crystals therein are aligned by applying a strong electric poling field to the capacitor 70 after manufacture.

Figure 9:
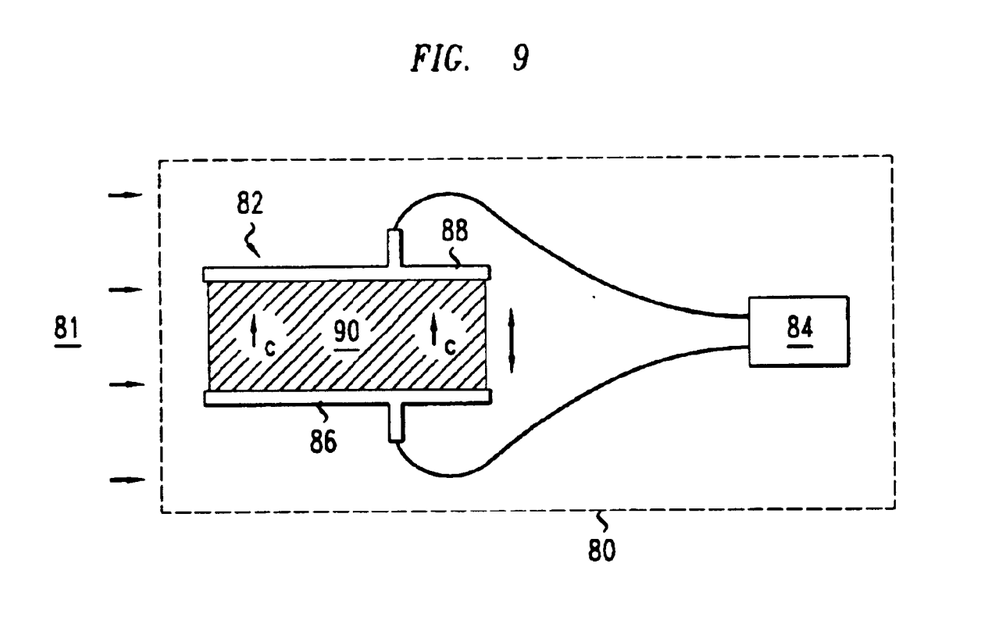
FIG. 9 shows a transceiver that uses the capacitor of FIG. 9 as an antenna.

FIG. 9 shows a transceiver 80 for detecting a microwave or millimeter wave transmission 81. The transceiver 80 includes a capacitor 82, e.g., capacitor 70 of FIG. 8, and an amplifier 84 connected to measure voltages across the capacitor electrodes 86, 88. The capacitor 82 functions as a receiving antenna that is sensitive to transmissions whose wavelengths are much larger than the distance, d, between the electrodes 86, 88. The high sensitivity results from a giant $\epsilon_1$ for the capacitor's dielectric 90 at operating temperatures. The giant $\epsilon_1$ produces a large voltage response when d is $(\epsilon_1)^{1/2}$ times smaller that half of the wavelength of the received signal.

Exemplary values for d are smaller than about one hundredth of the wavelength of the transmission signal. Thus, for microwave transmissions, "d" is less than 100 microns. Such small dimensions enable transceiver 80 to be an internal antenna even in very small wireless devices, e.g., cellular telephones and handheld Internet access devices, where internal space is limited.

Figure 10:
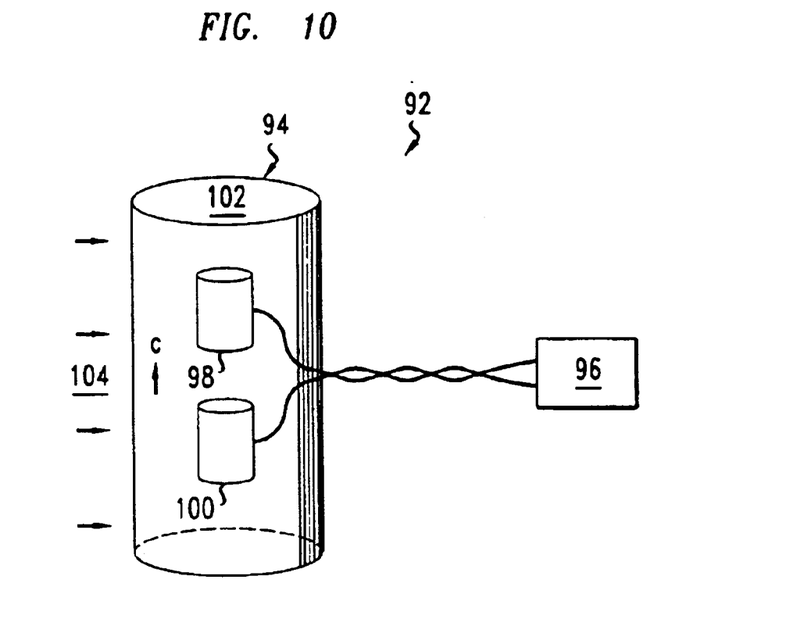
FIG. 10 shows another transceiver whose antenna is embedded in a charge or spin density wave material.

FIG. 10 shows another transceiver 92 based on a spin or charge density wave material. The transceiver 92 includes antenna 94 and signal processing unit 96. The signal processing unit 96 includes, e.g., a filter and a voltage amplifier. The antenna 94 includes two electrodes 98, 100 and a mass 102 of dielectric. The electrodes 96, 98 are embedded in the mass 102 of dielectric. The mass is a density wave material has an anisotropy direction "c" and a transition temperature that is above the operating temperature of the transceiver 92. The anisotropy direction "c" aligned along the direction of an imaginary line connecting the electrodes 98 and 100. Such an alignment increases the effective dielectric constant in the antenna thereby making the antenna 94 more sensitive to incoming signal wave 104.

The transceivers 80, 92 of FIGS. 9 and 10 are directionally most sensitive to transmission signal waves whose electric fields are oriented along the direction "c" that defines the anisotropy direction of the spin density wave material, e.g., dielectric materials 90 and 102 in FIGS. 9 and 10. To produce a less directionally sensitive receiver, some wireless devices use two or three separate transceivers with each of the transceivers having the form of transceiver 80 or 92. The three transceivers are oriented to optimally detect incoming transmissions along mutually perpendicular directions.

A tunable capacitor can be constructed from a charge or spin density wave material. Tuning results from an applied electric field, which changes the dielectric constant of the charge or spin density wave material. For example, FIG. 6 shows that an electric field in the range of 0.1 volt per centimeter (V/cm) and 10 V/cm strongly changes the dielectric constant of a $Sr_{14}Cu_{24}O_{41}$ cuprate ladder crystal when the field is applied along the crystal's c-axis. Thus, such fields are able to tune capacitors whose dielectrics are the $Sr_{14}Cu_{24}O_{41}$ cuprate ladder material. Other quasi 1D charge and spin density wave materials also have strong dielectric responses to applied electric fields and thus, also provide tunable dielectrics.

Figure 11:
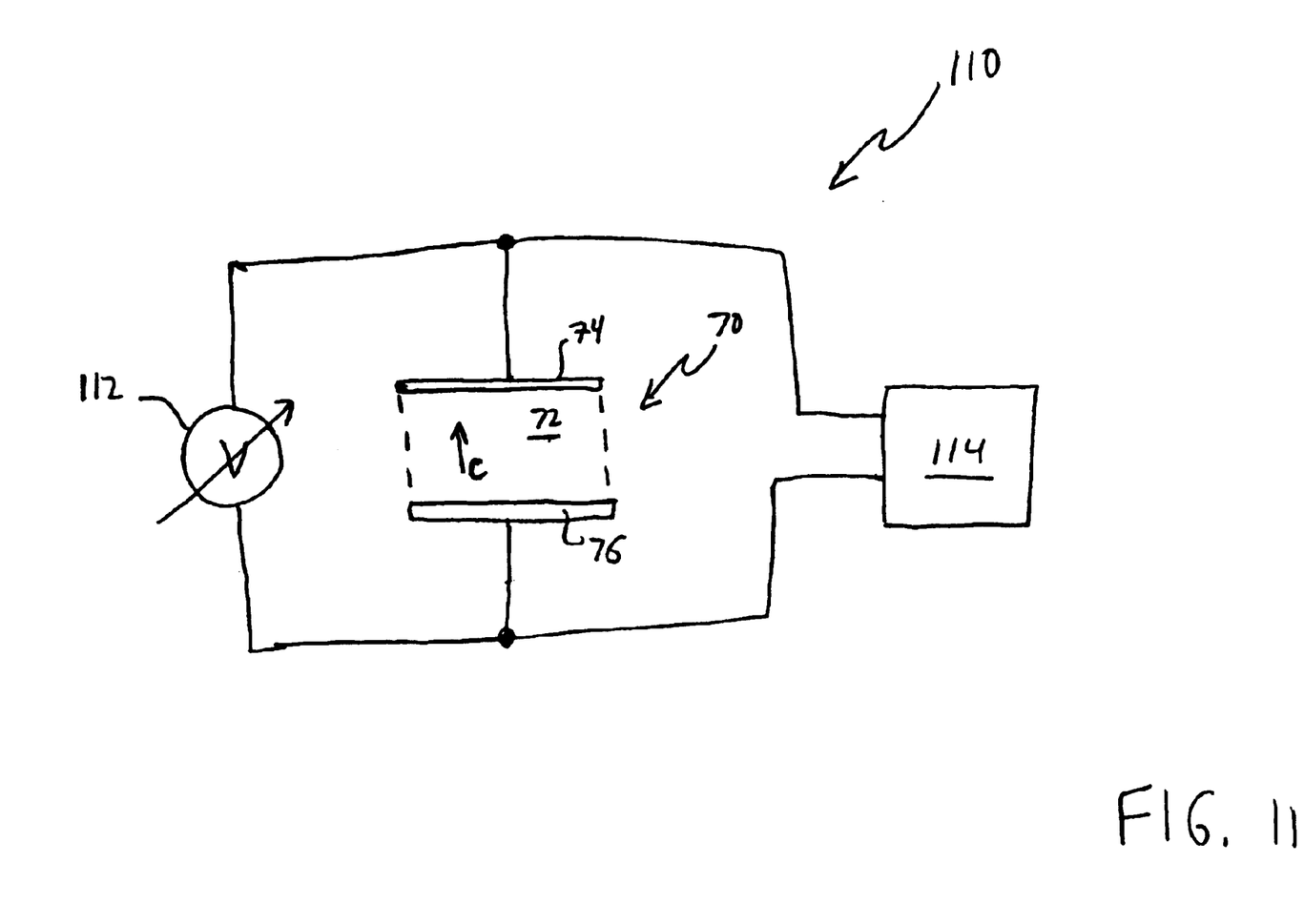
FIG. 11 shows a tunable capacitor whose dielectric is a charge or spin density wave material.

FIG. 11 shows a circuit 110 in which capacitor 70, shown in FIG. 8, is voltage tunable. In the circuit 110, a variable voltage source 112 applies a DC tuning voltage across the capacitor's dielectric 72, which is a material in a charge or spin density wave state. Varying the DC voltage tunes the material's dielectric constant and thus, tunes the capacitance of the capacitor 70. In the circuit 110, another electronic component 114 measures AC voltages across plates 74, 76 of the capacitor 70.

In some embodiments, circuit 110 is a wireless receiver. In the receiver, capacitor 70 functions as a receiving antenna and electronic component 114 functions as an input amplifier. Then, variable voltage source 112 enables tuning of the reception center frequency for the wireless receiver.

At least two processes are available for producing crystalline cuprates such as the above-described material whose stoichiometry is $Sr_{14}Cu_{24}O_{41}$.

One such process produces a crystalline cuprate with a stoichiometry of $Sr_{14}Cu_{24}O_{41}$. This process is described by E. M. McCarron, III in Mat. Res. Bull. Vol. 23 (1988) page 1356, which is incorporated by reference herein in its entirety. The process includes forming a mixture of stoichiometric amounts of $SrO_2$ and CuO. The process includes grinding the mixture in an agate mortar for about 30 minutes to produce a powder. The process also includes charging a quantity of the powder, e.g., 30 grams, into a gold crucible and heating the crucible to a final temperature in the range of about 875° C. to 900° C. during the heating, the temperature is raised at a slow rate of about 5° C. per hour until the final temperature is obtained. After arriving at the final temperature, the mixture is kept at that temperature for about 36 hours to produce a melt. Then, the melt is slowly cooled, e.g., at a rate of 1° C. per hour, until a final temperature of about 400° C. is obtained. Finally, the melt is further cooled to about 100° C. so that the crucible can be removed to obtain the final crystalline material.

Another process to make a single $Sr_{14}Cu_{24}O_{41}$ cuprate ladder crystal is described by Motoyama, Physical Review 55B (1997) page R3386, which is incorporated by reference herein in its entirety. Motoyama's process uses a traveling-solvent-floating-zone method described by Tanaka, Nature 337 (1989) page 21 and Kimura, J. Crystal Growth 41 (1977) 192. The Tanaka and Kimura references are also incorporated by reference herein in their entirety. The traveling-solvent-floating-zone method of Tanaka and Kimura includes first making a rod then, using the rod to grow the desired crystal. The rod serves both as feed and solvent during the crystal growth step.

A sintering process produces the rod. The sintering process includes forming an ethanol-based mixture having appropriate amounts of powdered CuO and $SrCO_3$. The process includes air-drying and then, calcinating the mixture for about 12 hours and at about 1123° K. to produce a powder. The powder is compressed with a pressure of about 100 MPa into a cylinder. The process includes sintering the cylinder in an oxygen atmosphere at a temperature of about 1273° K.–1473° K. After about 12 hours, the sintering produces the rod for growing the crystal.

To grow the cuprate ladder crystal, the previously formed rod is sintered. The sintering is done in a double-ellipsoidal infrared furnace to reduce evaporation of copper oxide. One such furnace uses two 1.5 kilowatt halogen lamps and is made by Nichiden Machinery Ltd. The crystal growth occurs in an oxygen atmosphere at a pressure of about 3–10 atmospheres.

From the disclosure, drawings, and claims, other embodiments of the invention will be apparent to those skilled in the art.

What is claimed is:

1. An apparatus, comprising:
   an antenna having first and second electrodes; and
   a quasi 1D dielectric material having a charge or spin density wave state, the electrodes located adjacent portions of the dielectric material.

2. The apparatus of claim 1, wherein the dielectric material is a quasi one-dimensional material whose anisotropy axis is oriented along a line going from one of the electrodes to the other of the electrodes.

3. The apparatus of claim 1,
   wherein the antenna is a capacitor whose plates are the first and second electrodes; and
   wherein the dielectric material is disposed between the electrodes.

4. The apparatus of claim 3, further comprising:
   a variable voltage source coupled across the capacitor.

5. The apparatus of claim 1, wherein the dielectric material has a spin density wave state.

6. The apparatus of claim 5, wherein the dielectric material has a spin density wave state at room temperature.

7. The apparatus of claim 5, wherein a melting transition for the spin density state is a temperature of 293° K or higher.

8. The apparatus of claim 5, wherein the dielectric material includes one of a cuprate ladder material and a vanadite.

9. The apparatus of claim 8, wherein the dielectric material includes strontium.

10. The apparatus of claim 1, wherein the dielectric material is a doped anti-ferromagnetic material with a transition temperature that is at least as high as room temperature.

11. The apparatus of claim 5, further comprising:
    an amplifier to connected to determine signal values from voltages between the electrodes and to detect transmission signals at wavelengths that are at least one hundred times longer than the distance between the first and second electrodes.

12. The apparatus of claim 1, wherein the quasi 1D dielectric material comprises a cuprate.

13. An apparatus, comprising:
    a capacitor having first and second electrodes;
    a quasi 1D dielectric material disposed between the electrodes, the dielectric material having a charge or spin density wave state.

14. The apparatus of claim 13, wherein the dielectric material acts as a quasi one-dimensional material and has an anisotropy axis oriented along a line from one of the electrodes to another of the electrodes.

15. The apparatus of claim 13, wherein the dielectric material has a spin density wave state.

16. The apparatus of claim 15, wherein the dielectric material has a spin density wave state at room temperature.

17. The apparatus of claim 15, wherein a melting transition for the spin density wave state has a temperature of 293° K or higher.

18. The apparatus of claim 15, wherein the dielectric material includes one of a cuprate ladder material and a vanadite.

19. The apparatus of claim 16, further comprising:
    an integrated circuit, the capacitor being located in the integrated circuit.

20. The apparatus of claim 13, wherein the dielectric material is an anti-ferromagnetic material with a transition temperature that is at least as high as room temperature.

21. The apparatus of claim 13, further comprising:
    a variable voltage source coupled across the capacitor.

22. The apparatus of claim 13, wherein the quasi 1D dielectric material comprises a cuprate.

* * * * *